Patented Feb. 24, 1948

2,436,658

UNITED STATES PATENT OFFICE 2,436,658

PROCESS FOR PRODUCING SULFAMIC ACID

Howard S. McQuaid, Wilmington, Del., assignor to E. I. du Pont de Nemours & Company, Wilmington, Del., a corporation of Delaware No Drawing. Application April 7, 1945, Serial No. 587,219

4 Claims. (Cl. 23—166)

This invention relates to the manufacture of sulfamic acid and is particularly directed to processes for producing sulfamic acid from urea, sulfuric acid, and sulfur trioxide by reacting the product of the reaction of urea and sulfuric acid in equimolecular quantities with liquid sulfur trioxide in a liquid vehicle consisting predominantly of liquid sulfur trioxide.

It is known that sulfamic acid may be obtained by the interaction of sulfuric acid, sulfur trioxide, and urea. See Baumgarten 2,102,350, Ber. 69B, 1929-37. The reaction is strongly exothermic and unless carefully carried out may proceed with violence. The various methods heretofore available for controlling the reaction have not been entirely satisfactory either because of the difficulty of recovering the product from the reaction mixture or because of difficulty of obtaining satisfactory cooling during the reaction.

The invention has for its objects to provide new and improved processes for the manufacture of sulfamic acid; to provide simple and effective means for dissipating the heat of reaction of urea, sulfuric acid, and sulfur trioxide; to provide safe and efficient processes of reacting equimolecular proportions of urea and sulfuric acid with sulfur trioxide; to obtain improved yields of sulfamic acid; to obtain improved quality of sulfamic acid; to reduce the cost of manufacture of sulfamic acid; to reduce operating hazards in the manufacture of sulfamic acid; to avoid the disadvantages of the prior art, and to obtain advantages as will appear hereinafter. Further objects will become apparent as the description proceeds.

These objects are accomplished in the present invention by the processes more particularly to be set out.

According to the invention, sulfamic acid is produced from urea, sulfuric acid, and sulfur trioxide simply and effectively by first forming the addition compound of urea and sulfuric acid by mixing urea and sulfuric acid in equimolecular quantities and then reacting the compound so formed with sulfur trioxide in a liquid vehicle consisting predominantly of liquid sulfur trioxide. By effecting interaction of sulfur trioxide, sulfuric acid and urea in a liquid vehicle consisting predominantly of liquid sulfur trioxide such effective control of the reaction as not heretofore considered possible is obtained. Effective control of the temperature of the reaction mixture is obtained because the heat of the reaction is easily dissipated into a heat of vaporization of liquid sulfur trioxide or into a suitable cooling medium circulated in heat transfer to the liquid sulfur trioxide. The reaction may therefore be maintained at a uniform temperature and the speed and velocity of the reaction accordingly determined. This close temperature control, coupled with a favorable effect obtained by having an excess of sulfur trioxide during the reaction makes it possible to produce a crude acid of high purity and yields.

The liquid sulfur trioxide serves a number of functions, for example, as a vehicle in which the reagents are dispersed or dissolved, as a heat transfer medium to control the temperature of the reaction, and as a reagent. An excess of sulfur trioxide also has been observed to have a beneficial effect upon the yield. By having a sufficient quantity of liquid sulfur trioxide in the reaction mixture to provide an easily fluid reaction mixture throughout, either by using sufficient sulfur trioxide in the beginning or by continually adding liquid sulfur trioxide, as, for example, by refluxing, as required to replace that evaporated, the reaction proceeds efficiently and without violence. Thus the invention provides highly efficient and economical methods for carrying out the reaction between urea, sulfur trioxide, and sulfuric acid, and besides being efficient and economical is capable of producing directly without refining a product which under optimum conditions is of higher purity and is obtained in higher yield, that is, without purification steps, than in the prior art methods.

The invention may be more fully understood by reference to the following examples in which the parts are by weight unless otherwise specified:

Example 1

A melt was prepared by adding 90 parts of urea to 144 parts of 100% $H_2SO_4$ at a temperature of 60–70° C. Of the clear melt so obtained and held at this same temperature 175 parts was added over a period of 40 minutes to 641 parts of liquid $SO_3$ with constant stirring. The heat of reaction was dissipated by boiling off $SO_3$, which was refluxed from a suitable condenser. This addition went completely into solution in the $SO_3$. The excess $SO_3$ was then gradually removed by slowly heating to a final temperature of 126° C. The dry residue (226 parts) analyzed as follows:

| | Per cent |
|---|---|
| Sulfamic acid | 91.3 |
| Ammonium acid sulfate | 5.4 |
| Sulfuric acid and sulfur trioxide calculated as sulfuric acid | 3.4 |
| | 100.1 |

The process of this example has the advantages that urea when combined with sulfuric acid is not so sensitive to gaseous sulfur trioxide, and that the urea may be added to the sulfur trioxide as a liquid.

*Example 2*

160 parts of commercial grade crystal urea were slowly added to 214 parts of 95% sulfuric acid with cooling and stirring, the temperature being kept below 45° C. The resulting product was a crystalline slurry at room temperature but on heating to 41° C. became a clear, homogeneous solution.

93.6 parts of the aforementioned solution was added slowly to 480 parts of liquid sulfur trioxide with vigorous agitation and with cooling provided by the refluxing of the sulfur trioxide. The entire addition was made in about 15 minutes. There was no evidence of violent reaction and no fuming. When the addition had been completed, the excess sulfur trioxide was distilled off, using vacuum in the later stages. The final product that was obtained still fumed strongly, indicating that removal of sulfur trioxide was incomplete. Analysis of the 142 parts of product showed it to contain 82.65% $NH_2SO_3H$, which is equivalent to a yield of 90.6%, based on the urea used.

The process of this example has the advantage that the mass obtained by mixing urea and sulfuric acid in equimolecular quantities melts at a lower temperature and is stable against decomposition to ammonium bisulfate under conditions (contact with steel or stainless steel) which catalyze decomposition of the anhydrous form of the product of the reaction of equimolecular quantities of urea and sulfuric acid.

This low melting mix is at least a three-component system, the product of the reaction of equimolecular proportions of urea and sulfuric acid, water, and urea, and there may be some uncombined sulfuric acid. The system is determined by the amount of water in the sulfuric acid while more or less than that illustrated may be used as desirable to keep the water to a minimum in order that as much as possible of the urea may be combined before making the addition to the liquid sulfur trioxide.

The proportions of the reagents may be varied widely but for optimum results the following should be observed. The theoretical proportions of urea, sulfur trioxide, and sulfuric acid are one mole of each, the reaction proceeding according to the following equation:

$$NH_2CONH_2 + SO_3 + H_2SO_4 \rightarrow 2NH_2SO_3H + CO_2$$

In figuring these proportions any water in the system or which might be picked up by the system during the reaction should be taken into account since water and sulfur trioxide combine in molecular proportions to give sulfuric acid. It is generally desirable to carry out the reaction with substantially one mole of sulfuric acid for each mole of urea, the sulfur trioxide being always substantially in excess by virtue of the reaction being carried out in a liquid vehicle consisting predominantly of liquid sulfur trioxide.

The amount of liquid sulfur trioxide may be varied widely according to the manner in which the process is carried out. Sufficient liquid sulfur trioxide should be present throughout the reaction to keep the reaction mixture as a fluent liquid throughout. This condition is maintained most conveniently and economically by carrying out the reaction under reflux. A suitable quantity of liquid sulfur trioxide is between about 6 to about 15 parts by weight for each part by weight of urea. A lesser amount may be used but it has been observed that the reaction becomes more difficult to control as the reaction mixture becomes viscous and of consequence it is desirable that sufficient liquid sulfur trioxide always be present to maintain the reaction mixture as a fluent liquid throughout the reaction. Any greater amount may be used but will not ordinarily be desirable in view of the recovery problem.

In the proper proportions the sulfur trioxide acts as a liquid vehicle in which the reagents are sufficiently dispersed that efficient and economical heat exchange may be obtained. Also, as previously noted, the excess of sulfur trioxide favorably influences the course of the reaction and materially contributes to the production of a product of high purity in high yield. Preferably the amount of liquid sulfur trioxide should be sufficient to provide a homogeneous solution throughout the reaction. It will generally be sufficient if the liquid sulfur trioxide constitutes at least about 70% of the reaction mixture, and under reflux or pressure it will not ordinarily be necessary or desirable to have the liquid sulfur trioxide constitute more than 85% of the reaction mixture.

The temperature during the sulfamic acid-forming reaction may vary widely but will ordinarily be maintained at the boiling point of the reaction mixture which will ordinarily range from about 45 to 60° C. By carrying out reflux under reduced pressure or by effecting cooling by heat exchange with the liquid sulfur trioxide lower temperature may be obtained though temperatures below about 30° C. do not appear to be desirable. Higher temperatures also may be obtained by effecting reflux, or by cooling by heat exchange, under superatmospheric pressure. Exceptionally high temperatures, however, are known adversely to affect sulfamic acid and consequently should be avoided. Thus temperatures up to about 120° C. may be used. For best results the temperature should be maintained low enough during the introduction of the product obtained by the mixture of equimolecular quantities of urea and sulfuric acid to prevent the sulfamic acid-forming reaction which begins to take place at about 75° C.

In the operation of the processes of the invention the temperature increases from the boiling point of liquid sulfur trioxide as the reagents are introduced and as the liquid sulfur trioxide is distilled off. When the temperature reaches about 75° C. copious evolution of carbon dioxide begins, indicating rapid formation of sulfamic acid. Alternatively the process may be carried out under superatmospheric pressure sufficient to raise the temperature to the level required for the release of carbon dioxide at a practical rate without substantial evaporation of sulfur trioxide. In this manner the carbon dioxide can be driven off while the reaction mixture is still highly fluent because of the liquid sulfur trioxide present.

The tendency of the reaction mixture to foam during the evaporation of the sulfur trioxide may continue even after the evolution of carbon dioxide has ceased. To overcome this difficulty, it is desirable at least in the latter stages of the distillation of the sulfur trioxide, to effect the distillation while the reaction mixture is in a dispersed state. This may be effected mechanically as in the case of a spray drier or a flaking drum, or by dispersing the reaction mixture throughout a heel of recycled sulfamic acid. When the reaction mixture is dispersed as a film upon the surface of a solid as in the case of a flaking drum or as in the case of admixture with a diluent such as a heel of recycled sulfamic acid, or when it is dispersed as discrete particles as in the spray drying, great surface is provided for the evolution of the gas and of consequence the evaporation may be effected easily and effectively without the complications described.

I claim:

1. In a process for the manufacture of sulfamic acid from the reactants, liquid sulfur trioxide and the product obtained by bringing together urea and sulfuric acid in equimolecular quantities, the steps comprising mixing said reactants in sufficient liquid sulfur trioxide to provide a liquid reaction mixture throughout the mixing step while agitating and cooling to inhibit fuming or evolution of carbon dioxide and thereafter heating to bring about evolution of carbon dioxide.

2. In a process for the manufacture of sulfamic acid from the reactants, liquid sulfur trioxide and the product obtained by bringing together urea and sulfuric acid in equimolecular quantities, the steps comprising mixing said reactants in a body of liquid sulfur trioxide to form a liquid reaction mixture, said liquid sulfur trioxide being present in amount to constitute from about 70 per cent to 85 per cent by weight of the reaction mixture, maintaining the temperature between about 30° C. and 75° C. during said mixing step, and thereafter heating the reaction mixture to a temperature between about 75° C. and 120° C.

3. In the manufacture of sulfamic acid, the steps comprising mixing equimolecular quantities of urea and sulfuric acid, adding the resulting mass to an excess of liquid sulfur trioxide sufficient to form a liquid reaction medium while agitating and cooling to inhibit fuming or evolution of carbon dioxide and thereafter heating to bring about evolution of carbon dioxide.

4. In the manufacture of sulfamic acid, the steps comprising mixing equimolecular quantities of urea and sulfuric acid, adding the resulting mass to a body of liquid trioxide to form a liquid reaction mixture, said liquid sulfur trioxide being present in amount to constitute from about 70 per cent to 85 per cent by weight of the reaction mixture, maintaining the temperature of the reaction mixture between about 45° C. and 60° C. during said addition step and thereafter heating the reaction mixture to a temperature between about 75° C. and 120° C.

HOWARD S. McQUAID.

REFERENCES CITED

The following references are of record in the file of this patent:

UNITED STATES PATENTS

| Number | Name | Date |
|---|---|---|
| 2,102,350 | Baumgarten | Dec. 14, 1937 |
| 2,191,754 | Cupery | Feb. 27, 1940 |
| 2,390,648 | Hill et al. | Dec. 11, 1945 |
| 2,408,823 | Tauch | Oct. 8, 1946 |
| 2,408,492 | Tauch | Oct. 1, 1946 |
| 2,409,572 | Leonard | Oct. 15, 1946 |

OTHER REFERENCES

Zeit. fur. Phys. Chemi. 61, 1908, pp. 280–299.

Koninklijke Akademie Van Wetinschappen Te Amsterdam, Procedings, 16/1, page 555, Dec. 1913.